United States Patent
Wilson et al.

(10) Patent No.: US 6,516,622 B1
(45) Date of Patent: Feb. 11, 2003

(54) METHOD AND APPARATUS FOR VARIABLE FREQUENCY CONTROLLED COMPRESSOR AND FAN

(75) Inventors: James J. Wilson; Donald A. Neve, both of Westminster; William B. Thomas, Aurora, all of CO (US)

(73) Assignee: BelAir Technologies, LLC, Centennial, CO (US)

( * ) Notice: Subject to any disclaimer, the term of this patent is extended or adjusted under 35 U.S.C. 154(b) by 0 days.

(21) Appl. No.: 09/593,977

(22) Filed: Jun. 13, 2000

(51) Int. Cl.[7] .............................................. F25B 49/00
(52) U.S. Cl. ..................................................... 62/228.3
(58) Field of Search ........................... 62/228.3, 196.1, 62/231; 417/32, 326; 34/361

(56) References Cited

U.S. PATENT DOCUMENTS

| | | | | |
|---|---|---|---|---|
| 3,802,213 A | * | 4/1974 | Ooka | 62/48.2 |
| 4,392,877 A | | 7/1983 | Funk | |
| 4,530,738 A | | 7/1985 | Funk | |
| 5,440,891 A | * | 8/1995 | Hindmon et al. | 236/78 D |
| 5,557,938 A | * | 9/1996 | Hanson et al. | 62/126 |
| 5,611,211 A | * | 3/1997 | Whipple, III | 62/149 |
| 5,617,729 A | * | 4/1997 | Hyman | 62/117 |
| 5,711,159 A | * | 1/1998 | Whipple, III | 62/186 |
| 5,860,287 A | * | 1/1999 | O'Neal | 62/201 |
| 6,047,557 A | * | 4/2000 | Pham et al. | 236/1 EA |
| 6,138,463 A | * | 10/2000 | Bascobert | 62/131 |
| 6,336,335 B2 | * | 1/2002 | Ota et al. | 123/198 R |

FOREIGN PATENT DOCUMENTS

| | | |
|---|---|---|
| DE | 35 22 974 A | 1/1987 |
| DE | 87 12 812 U | 2/1989 |
| FR | 2 648 055 A | 12/1990 |
| WO | WO99/61135 | 12/1999 |

* cited by examiner

*Primary Examiner*—Teresa Walberg
*Assistant Examiner*—Daniel Robinson
(74) *Attorney, Agent, or Firm*—Dorsey & Whitney LLP

(57) ABSTRACT

Compressor controls in a compressed gas system provides a variable frequency controlled refrigerant compressor in a dehydrator for compressed air or other cases. The system detects changes in a demand on the pneumatic air supply by monitoring a pressure of a refrigerant system associated with the air supply. Based on the changes in the refrigerant system pressure, a motor speed controller generates and sends a control signal to the variable speed compressor to adjust the speed of the variable speed compressor based on the demand in the air supply.

21 Claims, 11 Drawing Sheets

METHOD AND APPARATUS FOR VARIABLE FREQUENCY CONTROLLED COMPRESSOR AND FAN

FIELD OF THE INVENTION

This invention relates to compressor controls and more particularly to compressor controls in compressed gas systems having refrigerated dryers.

BACKGROUND OF THE INVENTION

Refrigerant compressors are used in a variety of systems. One type of system that uses refrigerant compressors is a compressed gas system. Compressed gas systems typically provide high volumes of dry, pressurized air or other gases to operate various items or tools (while a multitude of gases can be used, this application typically refers to air as a matter of convenience). Conventional systems dry the air using heat exchangers first to cool the air and lower the dew point of the air, which causes water vapor to condense out of the air, and second to reheat the air and raise the outlet temperature of the air. This system provides a relatively dry air source. FIG. 1 shows a conventional refrigerated dryer 100 for a compressed gas system. Refrigerated dryer 100 includes both an air heat exchanger circuit 110 and a refrigerant heat exchanger circuit 120. Air heat exchanger circuit 110 includes an inlet 112, an air-to-air heat exchanger 114, a air-to-refrigerant heat exchanger or evaporator 116, a water separator 120a and an air outlet 118. Refrigerant heat exchanger circuit 120 includes evaporator 116, a compressor 122, a condenser 124, a throttling device 126, and a hot gas by-pass valve 128.

Notice that temperatures used below to describe the operation of dryer 100 are exemplary only. Many different air temperatures and saturation levels are possible. The temperatures and saturation levels of the final operating system depend on a large variety of factors including for example system design specifications and local environmental factors. The factors that determine actual temperatures are beyond the scope of this patent application and, in any event, are well known in the art.

In operation, dryer 100 receives a high temperature, saturated, pressurized air or gas stream at inlet 112. For example, the air or gas may be at 100 degrees (all degrees represented are degrees Fahrenheit) with a dew point of 100 degrees (i.e., 100% humidity), although any inlet temperature and dew point is possible. The air or gas stream passes through an inlet side of air-to-air heat exchanger 114. The air or gas stream cools down to, in this example, 70 degrees with a dew point of 70 degrees (i.e., still 100% humidity). However, because 100 degree air or gas can carry a larger volume of water vapor than 70 degree air or gas, some water vapor condenses. The condensed moisture precipitates out and collects in the separator 120a. The 70 degree air or gas then travels through the air side of evaporator 116 where the air or gas is further cooled to approximately 35 degrees with a dew point of 35 degrees (i.e., still at 100% humidity). Again, moisture condenses out of the air or gas stream and collects in the separator 120a. The 35 degree air or gas then travels through the outlet side of air-to-air heat exchanger 114. This reheats the air or gas stream to approximately 85 degrees with a pressure dew point of 35 degrees. The air or gas stream then exits the dryer 100 at air outlet 118. Because 85 degree air can hold significantly more moisture vapor than 35 degree air, dryer 100 provides a source of dry, unsaturated, pressurized air or gas at air outlet 118.

In refrigerant heat exchanger circuit 120, refrigerant enters the refrigerant side of evaporator 116 as a cool liquid. While passing through evaporator 116, the refrigerant heats up and is converted to a gas by the exchange of heat from the relatively hot air side to the relatively cool refrigerant side of evaporator 116. The low pressure gas travels to compressor 122 where the refrigerant is compressed into a high pressure gas. The refrigerant than passes through air or water cooled condenser 124 where the refrigerant is condensed to a cool, high pressure liquid. The cool, high pressure refrigerant passes through throttling device 126 (typically capillary tubes or the like) to reduce the pressure and boiling point of the refrigerant. The cool, low pressure, liquid refrigerant than enters the evaporator and evaporates as described above.

When air heat exchanger circuit 110 and refrigerant heat exchanger circuit 120 operate at or near full capacity, hot gas by-pass valve 128 has no particular function. However, as the demand on air heat exchanger circuit 110 decreases, refrigerant heat exchanger circuit 120 has excessive capacity that could cause the liquid condensate in dryer 100 to freeze. Thus, when used in this situation, hot gas by-pass valve 128 functions to prevent the liquid condensate in dryer 100 from freezing. In particular, the hot gas by-pass valve opens feeding hot, high pressure gas around the evaporator (i.e., by-passes) maintaining a constant pressure and temperature in the evaporator preventing any condensate from freezing. The particulars regarding the operation of hot gas by-pass valve 128 are well known in the art. Typically, a temperature sensor associated with the hot gas by-pass valve (not specifically shown in FIG. 1) monitors the refrigerant temperature at the outlet of evaporator 116. When the temperature at the outlet decreases below a predetermined threshold, the hot gas by-pass valve 128 opens feeding hot, high pressure gas around the evaporator maintaining a constant pressure and temperature in the evaporator preventing any condensate from freezing.

The capacity of compressor 122 depends, in large part, on the maximum required capacity or expected air flow (measured in standard cubic feet per minute) of air heat exchanger circuit 110. At full capacity (or air flow), compressor 122 operates at 100% capacity and the air temperature and dew point of the air stream is, for example, approximately as described above. The demand on the air system, however, is not always 100% of the designed capacity. Frequently, the demand on air heat exchanger circuit 110 is somewhat below full capacity. With less than 100% demand on air heat exchanger circuit 110, the refrigerant heat exchanger circuit 120 described above still operates at 100% capacity, thus wasting energy or electric power because compressor 122 does not need to operate at full capacity. Some systems, as described above, compensate using hot gas by-pass valve 128. Hot gas by-pass solves the problem of providing to much cooling through refrigerant heat exchanger circuit 120, but does not solve the problem that the compressor is operating at a higher than necessary capacity and consuming a larger amount of electrical power than necessary. Other systems cycle the compressor on and off when the system operates at less than 100% capacity. These systems reduce power consumption somewhat, but cause excessive on and off cycling of compressor 122, wide fluctuations in the dew point at air outlet 118, and introduce inefficiencies associated with the heat exchange of mass media. Thus, it would be beneficial to control operation of compressor 122 based on the demand of air heat exchanger circuit 110 to reduce the power consumed by compressor 122 and increase the overall power efficiency of dryer 100.

SUMMARY OF THE INVENTION

To attain the advantages of and in accordance with the purpose of the present invention, as embodied and broadly described herein, apparatus for controlling the operating speed of a variable speed compressor in a refrigerated air drying system having changing demands on an air supply, include a demand sensor capable of sensing changes in the demand on the air supply and generating a change in demand signal. A motor speed controller receives the generated change in demand signal and generates a motor speed signal. The motor speed controller sends the motor speed signal to a motor of the variable speed compressor to change the speed of the variable speed compressor.

Other embodiments of the present invention provide methods for controlling the operating speed of a variable speed compressor in a refrigerated air drying system having changing demands on an air supply. These methods include sensing a demand on the air supply. Determining an operating speed for a variable speed compressor based on the sensed air supply demand. Controlling a speed of the variable speed compressor based on the determined operating speed.

Still other embodiments of the present invention provide computer program products having computer readable code for processing data to control a speed of the variable speed compressor. The computer program product has a demand sensing module configured to sense changes in the demand of the air supply. A generating module is configured to generate a signal indicative of the sensed change in demand. A motor speed controlling module is configured to receive the signal indicative of the sensed change in demand and generate at least one motor speed signal. The motor speed controlling module is adapted to send the motor speed signal to the variable speed compressor.

The foregoing and other features, utilities and advantages of the invention will be apparent from the following more particular description of a preferred embodiment of the invention as illustrated in the accompanying drawings.

BRIEF DESCRIPTION OF THE DRAWING

The accompanying drawings, which are incorporated in and constitute a part of this specification, illustrate embodiments of the present invention, and together with the description, serve to explain the principles thereof. Like items in the drawings are referred to using the same numerical reference.

DETAILED DESCRIPTION

Figure 1:
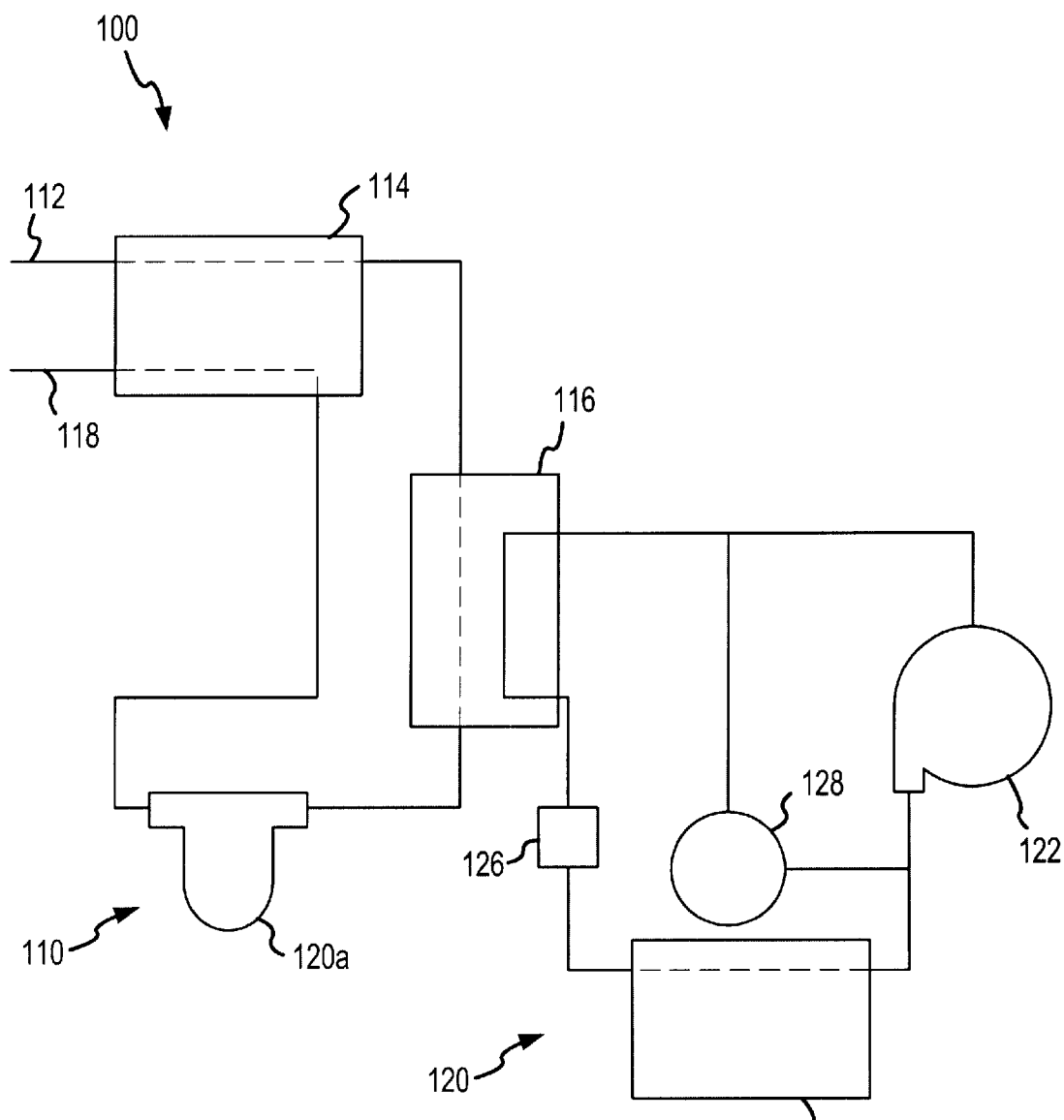
FIG. 1 is a system block diagram of a prior art refrigerated air drying system.
Figure 2:
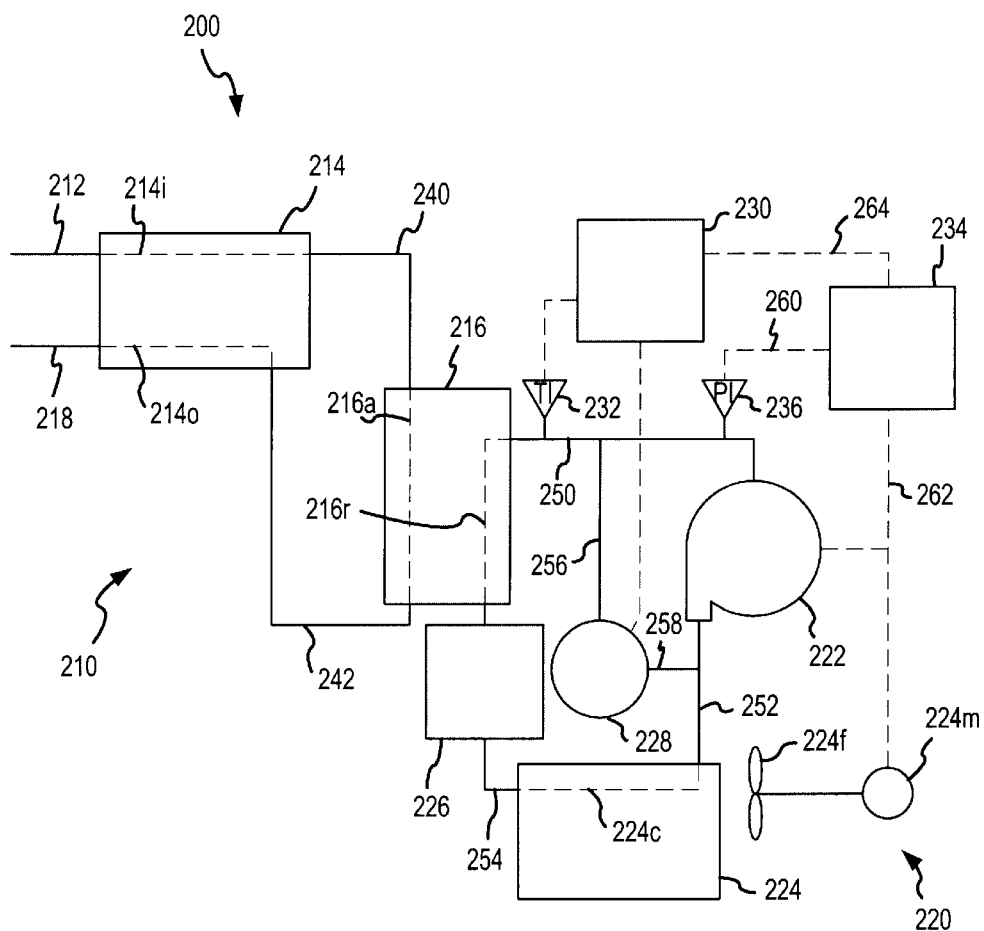
FIG. 2 is a system block diagram of a refrigerated air drying system in accordance with the present invention.

Some embodiments of the present invention are shown in FIGS. 2 through 9. FIG. 2 shows a refrigerated air dryer 200 in accordance with one possible embodiment of the present invention. Air dryer 200 includes both an air heat exchanger circuit 210 and a refrigerant heat exchanger circuit 220. Air heat exchanger circuit 210 includes an inlet 212, an air-to-air heat exchanger 214, a air-to-refrigerant heat exchanger or evaporator 216, and an air outlet 218. Air heat exchanger circuit 210 also has a conventional separator and automatic drain system (not shown) that is known in the art.

Air heat exchanger circuit 210 operates by receiving an air or gas stream at inlet 212. The air or gas stream travels through air-to-air heat exchanger 214. The air or gas stream circulates in piping 214 along the inlet side of air-to-air heat exchanges 214 to cool. After cooling, the air or gas stream exists into piping 240. The air or gas stream travels along piping 240 and enters air side piping 216a of evaporator 216. The air or gas stream is further cooled by evaporator 216. After this additional cooling, the air or gas stream exists into piping 242. The air or gas stream travels along piping 242 and enters the reheat side of air-to-air heat exchanger 214. The air or gas stream circulates in piping 214o, along the outlet side of air-to-air heat exchanger 214 to reheat. After reheating the air or gas steam exits air heat exchanger circuit 210 as hot, dry air or gas at outlet 218.

Refrigerant heat exchanger circuit 220 includes evaporator 216, a compressor 222, a condenser 224, a throttling device 226, and a hot gas by-pass valve 228. Refrigerant heat exchanger circuit 220 also has a hot gas by-pass controller 230, a temperature sensor 232, a motor speed control 234, and a pressure sensor 236. Also, one of ordinary skill in the art would now recognize that the pressure sensors could be replaced with other sensors capable of monitoring system pressure, such as, for example, temperature sensors. Similarly, one of ordinary skill in the art would now recognize that the temperature sensors could be replaced with other sensors, such as, for example, pressure sensors.

Refrigerant heat exchanger circuit 220 operates by circulating a refrigerant through evaporator 216 along piping 216r to cool down the air stream. While circulating through piping 216r, the refrigerant changes from a liquid to a low temperature vapor and exists evaporator 216 into piping 250. The pressure sensor 236 is connected to piping 250 to measure the pressure at the inlet to compressor 222. Compressor 222 receives the low pressure, gas refrigerant traveling in piping 250 and outputs the refrigerant as a high pressure, high temperature gas refrigerant into piping 252. The refrigerant circulates from piping 252 into condenser piping 224c where the refrigerant is condensed to a liquid and cooled. The refrigerant exits condenser 224 as a high pressure liquid into piping 254. Piping 254 includes throttling device 226. Piping segments 256 and 258 connect the hot and cool sides of refrigerant heat exchanger circuit 220 through hot gas by-pass valve 228.

When dryer 200 is operated at full capacity, compressor 222 operates at its normal operating capacity or frequency similar to the description of dryer 100 above. When air flow through air heat exchanger circuit 210 decreases, however, pressure sensor 236 detects the decrease in demand as a decrease in the system pressure of refrigerant heat exchanger circuit 220 from an expected operating pressure at the inlet of compressor 222. On sensing the decrease in pressure, sensor 236 generates and sends a decreased pressure signal to motor speed controller 234 through a signal conduit 260. Motor speed controller 234 registers the decreased pressure signal as a decrease in demand on air heat exchanger circuit 210 and, thereby, sends a signal over signal conduit 262 to compressor 222 that decreases the speed of the compressor motor, i.e. decreases the motor's operating frequency, which will be described in more detail below. This causes the system pressure of refrigerant heat exchanger circuit 220 at the inlet of compressor 222 to increase back to the expected operating pressure. The decrease in the motor operating frequency of compressor 222 causes a corresponding decrease in energy consumption.

When demand on air heat exchanger circuit 210 increases, pressure sensor 236 detects the increase in demand as an increase in the system pressure of refrigerant heat exchanger circuit 220 from an expected operating pressure at the inlet to compressor 222. On sensing the increase in pressure, sensor 236 generates and sends an increased pressure signal to motor speed controller 234 over signal conduit 260. Motor speed controller 234 registers the increased pressure signal as an increase in demand on air heat exchanger circuit 210 and, thereby, sends a signal over signal conduit 262 to compressor 222 that increases the speed of the compressor motor, i.e., increases the motor's operating frequency, which will also be described in more detail below. This causes the system pressure of refrigerant heat exchanger circuit 220 at the inlet of compressor 222 to decrease back to the expected operating pressure.

When demand on air heat exchanger circuit 210 remains constant, pressure sensor 236 can, depending on design choice, send an expected operating pressure signal to motor speed controller 234 or simply not send a signal to motor speed controller 234. In either case, motor speed controller 234 maintains the operating frequency of compressor 222 to maintain the expected operating pressure of refrigerant heat exchanger circuit 220 at the inlet of compressor 222.

In the present example, compressor 222 is sized so that one compressor can satisfy the cooling requirements of dryer 200. Compressor 222 has a minimum operating frequency. If the motor speed is reduced below that minimum the internal lubrication of the compressor will be insufficient and/or the refrigerant flow rate will not provide adequate oil return. Thus, motor controller 234 can only reduce the operating frequency of compressor 222 to compressor 222 to a predetermined minimum speed. (Note that motor controller 234 could control the speed of compressor 222 over its full range of speeds, i.e., 0 Hz to full frequency, if the minimum speed was not dictated by the compressor.) When compressor 222 operates at its minimum frequency, motor speed controller 234 sends a signal over signal conduit 264 to hot gas by-pass controller 230 to begin hot gas by-pass control of refrigerant heat exchanger circuit 220 to prevent the suction pressure/temperature from falling that, in turn, prevents condensed water vapor from freezing, which will be explained further below.

Figure 3:
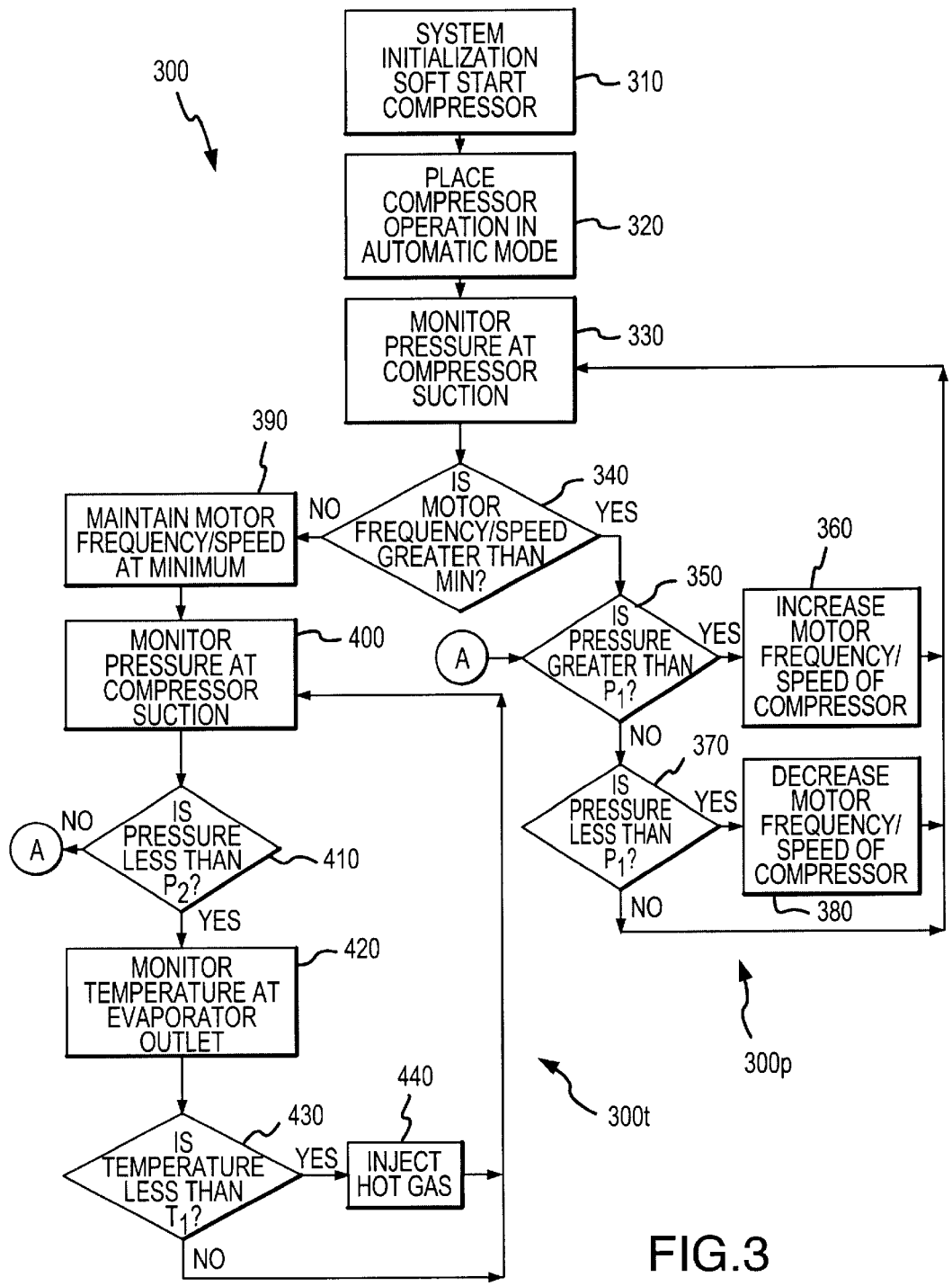
FIG. 3 is a flow chart describing the motor speed control drive of FIG. 2 in accordance with the present invention.

FIG. 3 shows a flow chart 300 indicating operation of refrigerant heat exchanger circuit 220. First, dryer 200 is initialized, step 310. This can include starting compressor 222 using a "soft-start" mode. A soft start mode is a procedure that brings the motor of compressor 222 up to speed following the motor control curves for the motor of compressor 222. The motor curves, not shown but generally known in the art, provide ideal voltage supplies to the motor of compressor 222 when the motor is operating at a given frequency. Additionally, these curves supply an optimal rate of change in frequency for a given unit of time. While it is preferred that motor speed controller 234 functions according to the motor control curves it is not necessary.

Once the system is initialized and compressor 222 soft-started, motor speed controller 234 is placed in an automatic mode, step 320. In automatic mode, motor speed controller 234 begins monitoring the pressure at the inlet to compressor 222, step 330. Next, motor speed controller 234 determines whether the motor speed of compressor 222 is greater than the minimum speed allowed, step 340. As noted above, the minimum speed of the motor of compressor 222 is based largely on the lubrication ability of the motor and is not a function of motor speed controller 234.

If the motor of compressor 222 is operating at greater than the minimum operating speed, motor speed controller 234 next determines whether the pressure at the inlet to compressor 222, as measured by pressure sensor 236, is greater than a first pre-established pressure threshold, step 350. If pressure is greater than the first pre-established pressure threshold, motor speed controller 234 increases the operating speed of the motor, step 360. Otherwise, motor speed controller 234 determines whether the pressure at the inlet to compressor 222 is less than the first pre-established pressure threshold, step 370. If pressure is less than the first pre-established pressure threshold, motor speed controller 234 decreases the operating speed of the motor, step 380. Of course, if the monitored pressure is approximately the same as the first pre-established pressure threshold, motor speed controller 234 simply maintains the operating speed of the compressor. After any required operating speed adjustments, the control loop is returned to step 330.

In the preferred embodiment, the above control is referred to as a "pressure mode" 300p because motor speed controller 234 uses a pressure signal from pressure sensor 236 to control motor speed. Alternative means of controlling the motor speed are possible. For example, a flow meter in air heat exchanger circuit 210 could be used to measure system demand and control the motor speed of compressor 222. Alternatively, a temperature sensor could be used in place of pressure sensor 236 to measure the system demand. Essentially any conventional demand sensor could be used to control the motor speed.

If at step 340 motor speed controller 234 had determined that the motor of compressor 222 was already operating at its minimum operating speed, motor speed controller would begin a "hot gas mode" 300t of refrigerant heat exchanger circuit 220. In hot gas mode, motor speed controller 234 maintains the speed of the motor of compressor 222 at the minimum operating speed, step 390. Pressure sensor 236 continues to monitor the pressure at the inlet to compressor 222, step 400. Motor speed controller determines whether the pressure at the inlet of compressor 222 is less than a second pre-established pressure threshold, step 410. If pressure is less than the second pre-established pressure threshold, hot gas by-pass controller 230 senses the temperature at the outlet of evaporator 216 using sensor 232, step 420. Next, hot gas by-pass controller 230 determines whether the temperature at the outlet of evaporator 216 is below a hot gas by-pass pre-established temperature threshold, step 430. If the temperature is below a hot gas by-pass pre-established temperature threshold, hot gas by-pass controller 230 causes hot gas by-pass valve 228 to cycle and inject hot gas from piping 252 on the outlet side of compressor 222 into piping 250 on the outlet side of evaporator 216, step 440. After the hot gas is injected or if pressure was above the hot gas by-pass pre-established pressure threshold, control reverts back to step 400.

If at step 410 motor speed controller 234 had determined pressure was not less than the second pre-established pressure threshold, then motor speed control 234 reverts back to pressure control at step 350, above. In the preferred embodiment, the second pre-established pressure threshold is sufficiently higher than the first pre-established pressure threshold to prevent excessive cycling between hot gas mode 300t and pressure mode 300p. The settings for the first and second pre-established pressure thresholds is, however, largely a matter of design choice. The hot gas by-pass threshold settings are well known in the art.

The embodiment of the present invention described above shows dryer 200 with one compressor 222 that is sized to accommodate 100% or full demand on air heat exchanger circuit 210. Under this configuration, the motor speed of compressor 222 could be varied from minimum to full capacity to vary the power consumption of the overall system. Also, as is known in the art, condenser 224 has a fan 224f and a fan motor 224m associated with it to assist in cooling and condensing the refrigerant. The fan motor 224m could be a variable speed motor controlled by motor speed controller 234. In this case, the fan motor would receive a motor speed control signal over conduit 262 so that the fan motor speed and the speed of the compressor motor would coincide. Thus, if air supply demand on air heat exchanger circuit 210 was 80%, under the above described control scheme, the motor of compressor 222 would be operating at 80% and the fan motor associated with the condenser would be operating at 80%.

Notice that the fan motor could be controlled by a separate motor speed controller. It is currently preferred to use a separate motor speed controller for fan motor 224m to prevent excessive cycling of fan motor 224m that could occur if fan motor 224m was controlled at the same speed as the motor of the compressor. In one present preferred embodiment, the fan motor is controlled using the same control scheme as outlined in flow chart 300, but using a separate controller. Using a separate control has the additional advantage that the fan motor can be controlled from 0 Hz to its maximum frequency because the fan motor does not have the same lubrication requirements as the compressor motor. When using a separate motor speed controller to control the operating speed of fan motor 224m, it is preferable to control the speed based on a demand sensor that measures condensing pressure (a demand sensor that measures condensing pressure is not specifically shown in the drawing, but is generally known in the art) instead of the demand sensor that measures the pressure at the inlet to the compressor.

Figure 4:
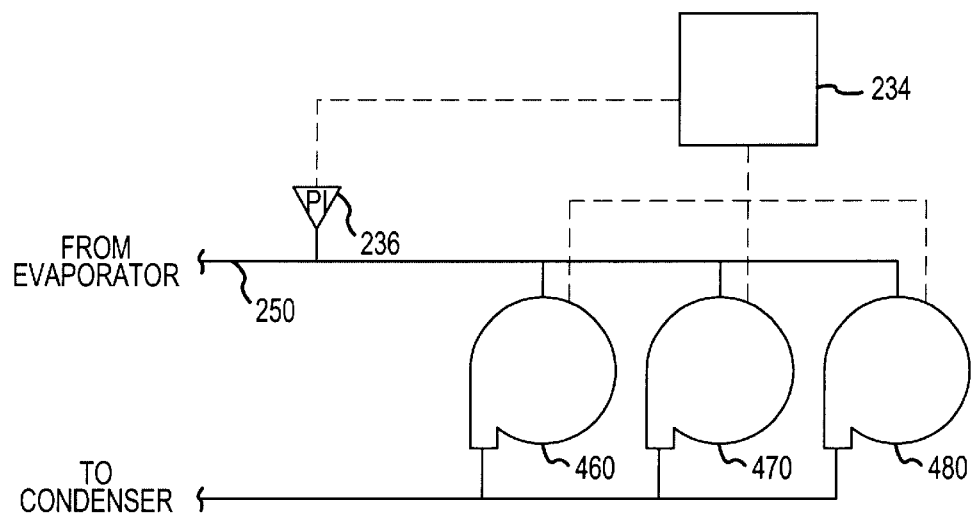
FIG. 4 is a block diagram showing compressors arranged in parallel in accordance with an embodiment of the present invention.

More precise control over the power consumption could be obtained by using more compressors or compressors with unloading devices and/or variable speed controlled condenser fan motors. This would be helpful in systems where power consumption is of greater concern, or more precise control over the coolant system is needed. For example, FIG. 4 shows three compressors 460, 470, and 480 arranged in parallel. In this embodiment, motor speed controller 234 would control compressor 460 in a variable speed mode and control compressors 470 and 480 by simple on/off instructions. Additionally, compressor 460, being the variably controlled compressor, is preferably capable of twice the capacity of compressors 470 and 480. In this manner, demand on the air source could be controlled down to about 25% capacity of the air flow. As one of ordinary skill in the art would now recognize, adding more or less compressors allows more or less precise control of the power consumption. While the variably controlled compressor is preferred to be about twice the size of the other compressors, almost any arrangement is possible.

Figure 5:
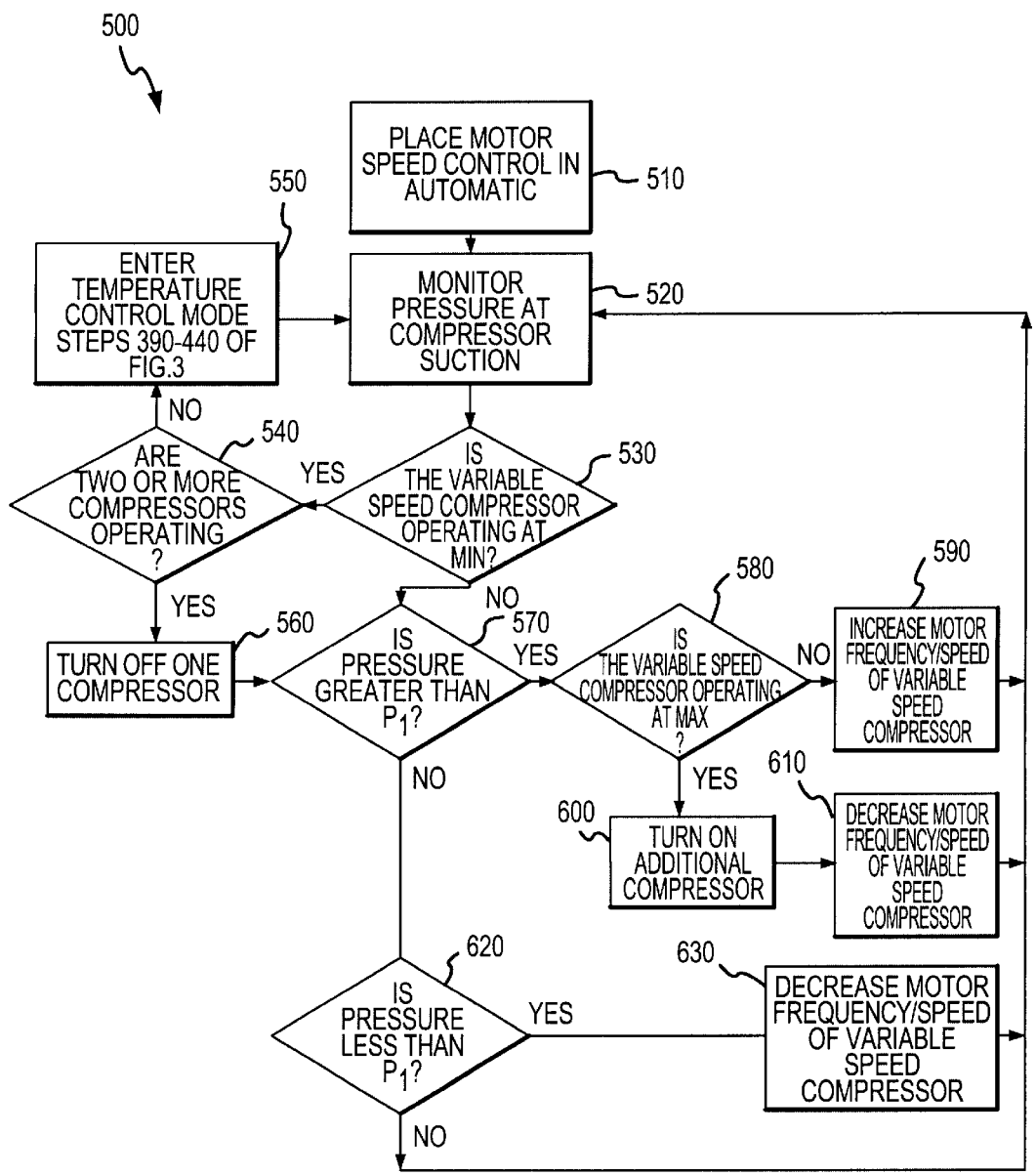
FIG. 5 is a flow chart describing the operation of the motor speed controller with compressors as arrayed in FIG. 4.

FIG. 5 is a flow chart 500 representing operation of the present invention with multiple compressors 460, 470 and 480. First, the motor speed controller would be placed in automatic control, step 510, and the pressure sensor would monitor pressure at the inlet of compressors 520. Next, the motor controller would determine whether the variable speed compressor motor is operating at a minimum frequency, step 530. If compressor 460 is operating at a minimum speed, motor speed controller 234 next determines whether two or more compressors are currently operating, i.e., compressor 460 and compressors 470 and/or 480, step 540. If only compressor 460 is operating, refrigerant heat exchanger circuit 220 enters hot gas mode control, step 550. Step 550 is substantially as described in steps 390 to 440 of FIG. 3. If motor speed controller 234 determines that one or both of compressors 470 and 480 are operating in addition to variable speed compressor 460, then motor speed controller turns one of the compressors 470 or 480 off, step 560, and returns the control to the control loop at step 570, below.

If motor speed controller 234 had determined that variable speed compressor 460 was not operating at its minimum, step 530, motor speed controller 234 would then determine whether pressure at the inlet to compressors 460, 470, and 480 was greater than the first pre-established pressure threshold, step 570. If pressure is greater than the first pre-established pressure threshold, which indicates an increase in demand on air heat exchanger circuit 210, then motor speed controller 234 checks whether variable speed compressor 460 is operating at its maximum, step 580. If variable speed compressor 460 is not operating at its maximum, motor speed controller 234 increases the speed of variable speed compressor 460, step 590, and the control loop returns to step 520. If, however, motor speed controller 234 determines that variable speed controller 460 is operating at its maximum, step 580, then motor speed controller turns on another compressor, either compressor 470 or 480, and brings that compressor up to its normal operating speed, step 600. After turning on the additional compressor, motor speed controller 234 would decrease the speed of variable speed compressor 460, step 610, and the control loop would return to step 520.

If, at step 570, motor speed controller 234 had determined that pressure was not greater than the first pre-established pressure threshold, it would determine whether pressure was less than the first pre-established pressure threshold, step 620. If motor speed controller 234 determines pressure is less than the first pre-established pressure threshold, then it decreases the speed of variable speed compressor 460, step 630, and control returns to the control loop at step 520.

In this embodiment, if the demand on air heat exchanger circuit 210 is 25% of full capacity, compressor 460 is operating at 50% and both compressors 470 and 480 are off. As demand of air heat exchanger circuit 210 increases, the speed of compressor 460 is increased until demand on air heat exchanger circuit 210 is 50% and compressor 460 is operating at 100% capacity. As demand on air heat exchanger circuit 210 increases past 50%, a second compressor 470 would be turned on to supply 25% of the necessary flow and the speed of compressor 460 would drop down to 50% to supply the other 25%. In other words compressor 460 would be operating at 50% capacity and compressor 470 would be operating at 100% capacity. As demand on air heat exchanger circuit 210 increased from 50% to 75%, the speed of compressor 460 is increased until it is operating at 100% capacity. When demand increases over 75%, compressor 480 is turned on and the speed of compressor 460 is reduced to 50% such that compressor 460 is at 50%, and compressors 470 and 480 are at 100%. Similarly, other combinations of parallel compressors could be used. One example includes a variable speed compressor capable of 40% capacity and three of compressors capable of 20% capacity each. Another example includes one variable compressor capable of 70% capacity and two on/off compressors capable of 15% capacity, which is useful when precise control is only necessary at higher capacities. In general, however, any percentage combination is possible. It is beneficial that the variable compressor capacity be larger than the nonvariable speed compressors to avoid gaps in the control.

Figure 6:
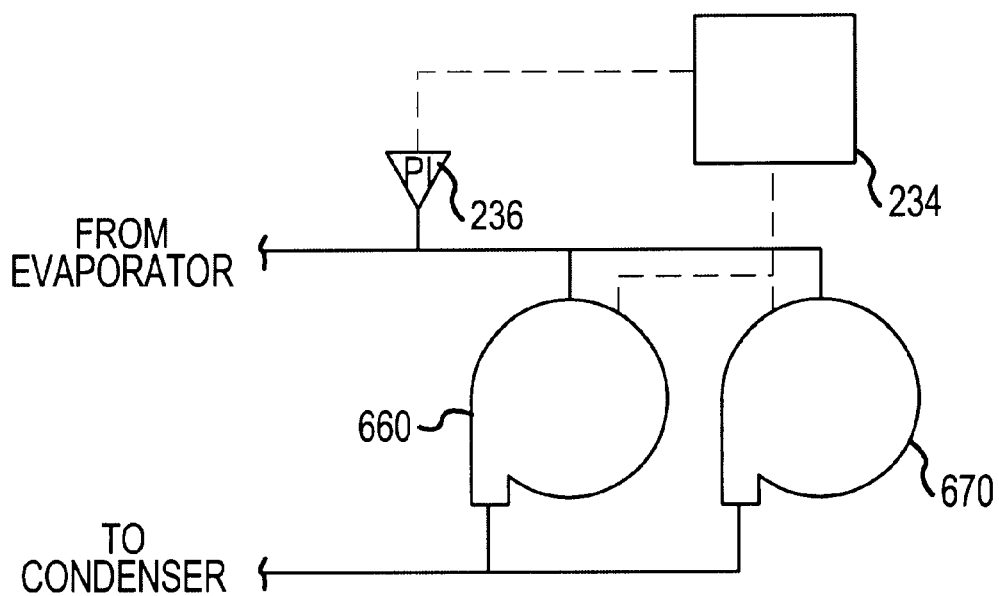
FIG. 6 is a block diagram showing two variable speed compressors arranged in parallel in accordance with another embodiment of the present invention.

In still another embodiment of the present invention, it is possible to control two or more variable speed compressors. For example, FIG. 6 shows first and second variable speed compressors 660 and 670 arranged in parallel. In this case, motor speed controller 234 could control the speed of both compressors or, in the alternative, a second motor speed controller could be added, not shown. In the preferred embodiment, each compressor is sized to accommodate equal portions of full capacity on refrigerant heat exchanger circuit 220. Additionally, if only one motor speed controller is used, it is preferable that the compressors be of equal capacity. In this case, compressors 660 and 670 are each capable of approximately one-half of full capacity.

Figure 7A:
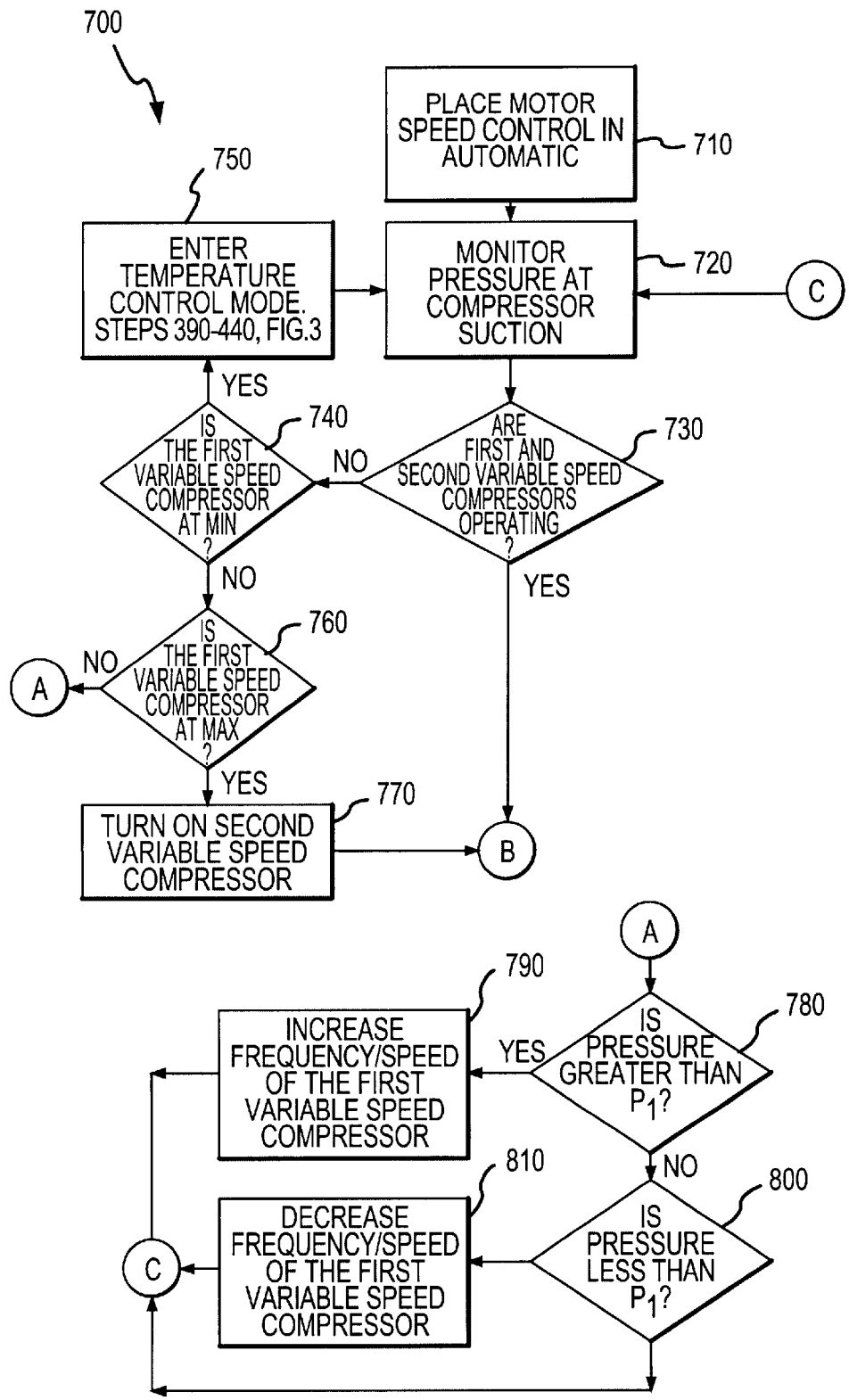
FIGS. 7A and 7B are a flow chart describing the operation of the motor speed controller with compressors arrayed as in FIG. 6.
Figure 7B:
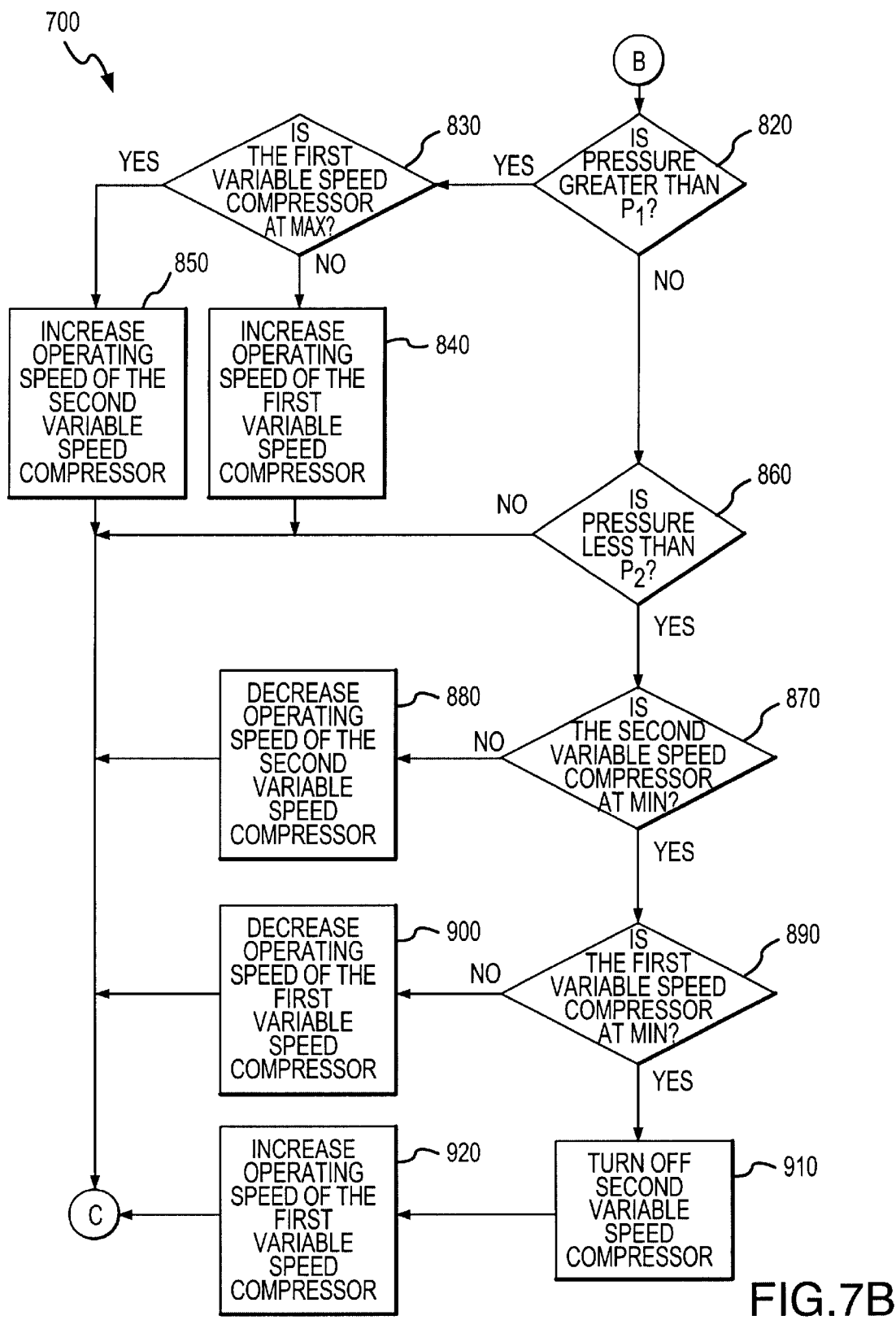

FIGS. 7A and 7B show a flow chart 700 indicating operation of the present invention with first and second variable speed compressors 660 and 670, respectively. As with the previous embodiments, dryer 200 is placed in operation and motor controller 234 is operating in automatic mode, step 710. In automatic mode, pressure sensor 236 monitors pressure of refrigerant heat exchanger circuit 220 at the inlet of first and second compressors 660 and 670, step 720. The motor speed controller next determines whether first and second variable speed compressors are operating, step 730.

If first and second variable speed compressors 660 and 670 are not operating, it is further determined whether first variable speed compressor 660 is operating at its minimum speed, step 740. If first variable speed compressor 660 is operating at the minimum speed, dryer 200 enters hot gas mode as described in Steps 390 to 440 of flow chart 300 of FIG. 3, step 750. Otherwise, it is further determined whether first variable speed compressor 660 is operating at its maximum speed, step 760. If first variable speed compressor 660 is operating at its maximum speed, second variable speed compressor 670 is turned on, step 770. If second variable speed compressor 670 is turned on, control moves to step 820, as will be described below, otherwise the speed of first variable speed compressor 660 is controlled in steps 780, 790, 800, and 810, in a manner substantially identical to steps 350, 360, 370, and 380 described in flow chart 300 of FIG. 3, above.

If first and second variable speed compressors are operating, motor speed controller 234 determines whether pressure is greater than a first pre-established pressure threshold, step 820. If pressure is determined to be greater than the first pre-established pressure threshold, it is further determined whether first variable speed compressor 660 is operating at its maximum operating speed, step 830. If first variable speed compressor 660 is not operating at its maximum operating speed, the speed of compressor 660 is increased, step 840, otherwise the speed of compressor 670 is increased, step 850. The control loop then returns to step 720.

If it is determined that pressure is not greater than the first pre-established pressure threshold, it is next determined whether pressure is less than the first pre-established pressure threshold, step 860. If pressure is less than the first-established pressure threshold, it is next determined whether second variable speed compressor 670 is operating at it minimum speed, step 870. If compressor 670 is not operating at its minimum speed, then its speed is decreased, step 880, and the control loop returns to step 720. If compressor 670 is operating at its minimum speed, then it is determined whether first variable speed compressor 660 is operating at its minimum speed, step 890. If compressor 660 is not at its minimum speed, then its speed is decreased, step 900, and the control loop returns to step 720. If it is determined that first variable speed compressor is also operating at its minimum speed, then second variable speed compressor 670 is turned off, step 910, and the speed of first variable speed compressor 660 is increased, step 920, and the control loop returns to step 720. As before, if pressure is neither greater than nor less than the first pre-established threshold, control simply returns to step 720 without altering the speed or configuration of the compressors.

Figure 8:
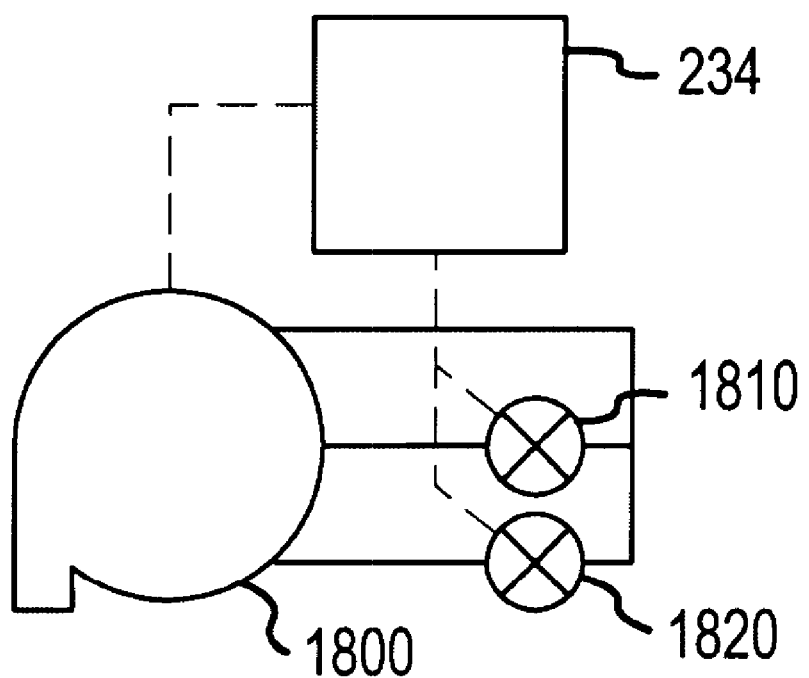
FIG. 8 is a block diagram showing a compressor with two unload devices in accordance with an embodiment of the present invention.

FIG. 8 shows a variable speed compressor 1800 with two unload devices 1810 and 1820 arranged in parallel. As one of ordinary skill in the art would now recognize, any number of unload devices could be arranged in parallel. In this embodiment, motor speed controller 234 would control the motor speed of compressor 1800 in variable speed mode and control unload devices 1810 and 1820 by simple on/off instructions. In general terms, compressor 1800 has multiple cylinders. The compressor is controlled using a variable speed motor and, in this example, two unloading devices are controlled by on/off instructions that de-energize and energize the unload devices. When demand on the air supply is low, the variable speed motor controlled compressor is operated and unload devices 1810 and 1820 are energized, which causes the output of the cylinders to be reduced. As the demand increases, the unload devices are de-energized as necessary. When all unload devices are de-energized, the compressor supplies its rated output.

Compressor 1800, being the variably controlled compressor, supplies 100% of its total capacity when both unload devices are de-energized, 66% of its total capacity with one unload device energized and one unload device de-energized, and 33% of its total capacity with both unload devices energized. In this manner, demand on the air source could be controlled down to approximately 16% capacity of the air flow. As one of ordinary skill in the art would now recognize, altering the number of unload devices allows more or less precise control of the power consumption. While the variably controlled compressor is preferred to have two unloading devices, almost any arrangement is possible.

Figure 9:
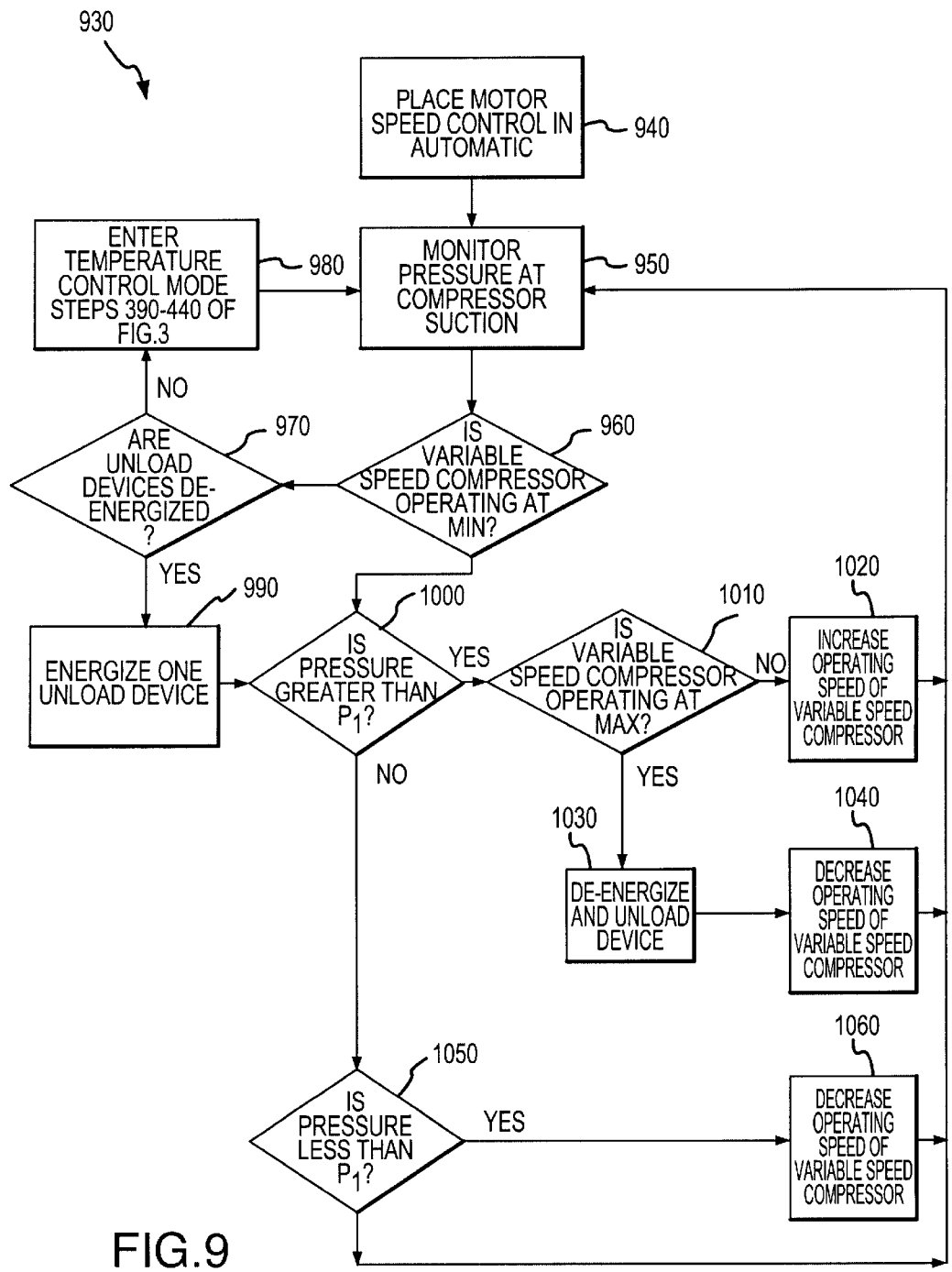
FIG. 9 is a flow chart describing the operation of the motor speed controller with a compressor as shown in FIG. 8.
Figure 10:
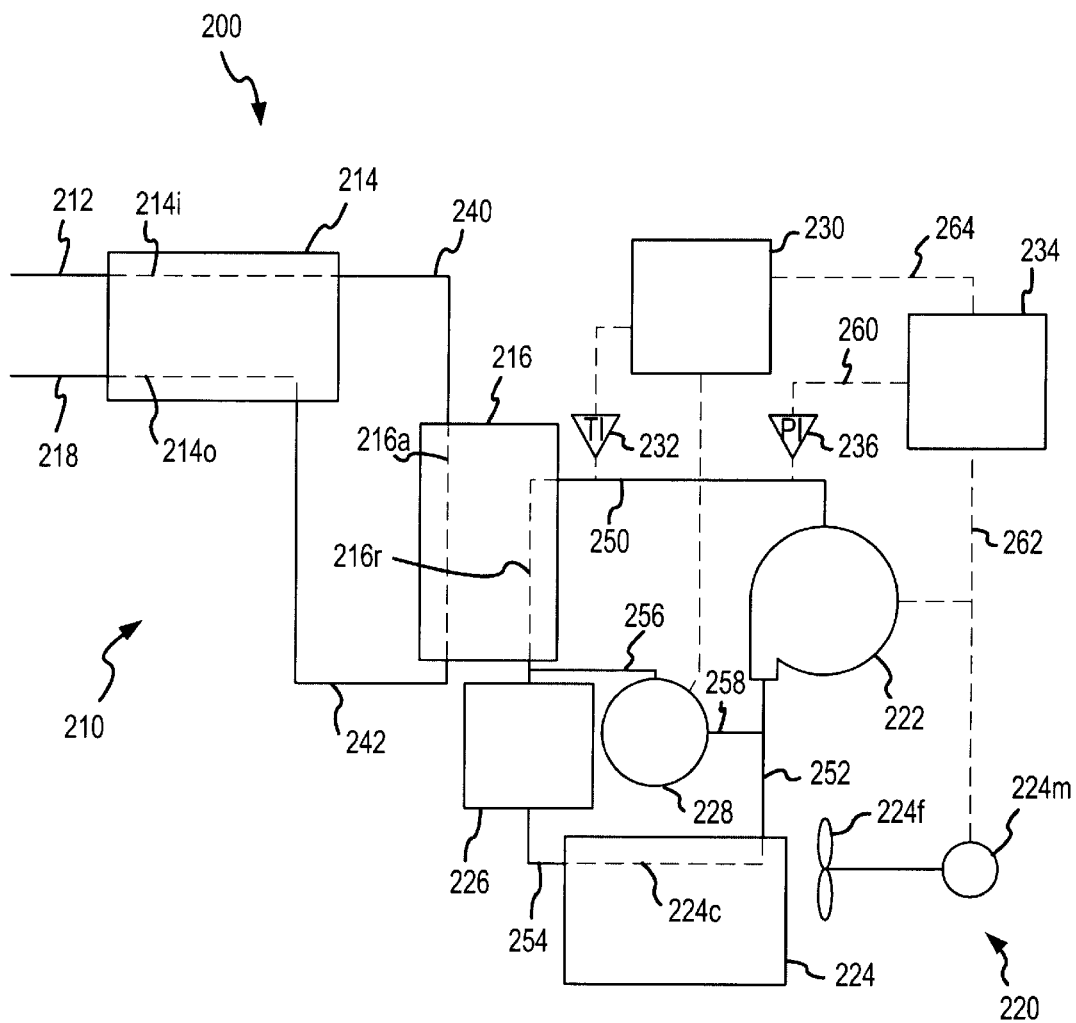
FIG. 10 is a system block diagram of a refrigerated air drying system in accordance with the present invention.

FIG. 9 is a flow chart 930 representing operation of the present invention with variable speed compressor 1800 having two unload devices 1810 and 1820. First, the motor speed controller would be placed in automatic control, step 940, and the pressure sensor would monitor pressure at the inlet of compressor 1800, step 950. Next, the motor controller would determine whether the variable speed compressor motor is operating at greater than a minimum speed, step 960. If compressor 1800 is operating at a minimum speed, motor speed controller 234 next determines whether two or more unload devices are currently de-energized, i.e., variable speed compressor 1800 and associated unload devices 1810 and 1820 are operating, step 970. If compressor 1800 is operating with both upload devices energized, hot gas control mode is initiated, step 980. Step 980 is substantially as described in steps 390 to 450 of FIG. 3. If motor speed controller 234 determines that one or both of unload devices 1810 and 1820 are energized in addition to variable speed compressor 1800, then motor speed controller de-energizes one of the unload devices 1810 or 1820, step 990, and returns the control to the control loop at step 1000, below.

If motor speed controller 234 had determined the variable speed compressor 1800 was not operating at its minimum, step 960, motor speed controller 234 would then determine whether pressure at the inlet to compressor 1800 was greater than the first pre-established pressure threshold, step 1000. If pressure is greater than the first pre-established pressure threshold, which indicates an increase in demand on air heat exchanger circuit 210, then motor speed controller 234 checks whether variable speed compressor 1800 is operating at its maximum, step 1010. If variable speed compressor 1800 is not operating at its maximum, motor speed controller 234 increases the speed of variable speed compressor 1800, step 1020, and the control loop returns to step 950. If, however, motor speed controller 234 determines that variable speed compressor 1800 is operating at its maximum, step 1010, then motor speed controller de-energizes an unload device, either 1810 or 1820, step 1030. After de-energizing the additional unload device, motor speed controller 234 would decrease the speed of variable speed compressor 1800, step 1040, and the control loop would return to step 950.

If, at step 1000, motor speed controller 234 had determined that pressure was not greater than the first pre-established pressure threshold, it would determine whether pressure was less than the first pre-established pressure, step 1050. If motor speed controller 234 determines pressure is less than the first pre-established pressure threshold, then it decreases the speed of variable speed compressor 1800, step 1060, and control returns to the control loop at step 950.

In this embodiment, if the demand on air heat exchange circuit 210 is 16% of full capacity, compressor 1800 is operating at 50% and both unload devices 1810 and 1820 are energized. As demand of air heat exchanger circuit 210 increases, the speed of compressor 1800 is increased until demand on air heat exchanger circuit 210 is about 33% and compressor 1800 is operating at maximum speed. As demand on air heat exchanger circuit 210 increases past 33%, an unload device 1810 would be de-energized to supply 33% of the necessary flow and the speed of compressor 1800 would drop down to 50% to supply the other 16%. In other words, compressor 1800 would be operating at 50% capacity and unload device 1810 would be off. As demand on air heat exchanger circuit 210 increased to 66%, the speed of compressor 1800 is increased until it is operating at maximum speed. When demand increases over 66%, unload device 1820 is de-energized and the speed of compressor 1800 is reduced to 50% such that compressor 1800 is at 50%, and the unload devices are de-energized. Many combinations of unload devices and compressors could be used. The above embodiments are only exemplary of the possible combinations. For example, a variable speed compressor could have three unload devices capable of 25% capacity each. Another example includes one variable compressor with five unload devices capable of 15% capacity. In general, however, any percentage combination is possible.

While the invention has been particularly shown and described with reference to a preferred embodiment thereof, it will be understood by those skilled in the art that various other changes in the form and details may be made without departing from the spirit and scope of the invention. Additionally, other embodiments of the invention will be apparent to those skilled in the art from consideration of the specification and practice of the invention disclosed herein. It is intended that the specification and examples be considered as exemplary only, with the true scope and spirit of the invention being indicated by the following claims.

We claim:

1. An apparatus for controlling the operating speed of at least one variable speed refrigeration compressor in a refrigerated gas drying system having changing demand on a gas supply, the apparatus comprising:

a first heat exchanger circuit for drying a gas supply;

a demand sensor capable of sensing changes in the demand on the gas supply and generating a change in demand signal; and a motor speed controller that receives the change in demand signal to generate a motor speed signal, wherein the motor speed controller is adapted to send the motor speed signal to the at least one variable speed compressor to change the speed of the at least one variable speed compressor to change the speed of the at least one variable speed compressor such that the speed of the at least one variable speed compressor is based on the sensed demand.

2. The apparatus of claim 1 wherein the motor speed controller is further adapted to send a motor speed signal to at least one condenser fan motor to change the speed of the at least one condenser fan motor such that the speed of the at least one condenser fan motor is based on the sensed demand.

3. The apparatus of claim 1 wherein the gas is air.

4. The apparatus of claim 1 wherein the demand sensor is a pressure sensor.

5. The apparatus of claim 1 wherein the demand sensor is a temperature sensor.

6. The apparatus of claim 1 wherein the demand sensor is a flow meter.

7. The apparatus of claim 1 wherein the apparatus further comprises:

a hot gas by-pass sensor for monitoring the temperature of the refrigerant system; and a hot gas by-pass such that when the temperature of the refrigerant system falls below a hot gas by-pass threshold, the temperature sensor generates a hot gas by-pass signal that causes the hot gas by-pass to increase the temperature of the refrigerant.

8. The apparatus of claim 7 wherein the hot gas by-pass sensor is a pressure sensor.

9. The apparatus of claim 7 wherein the hot gas by-pass sensor is a temperature sensor.

10. The apparatus of claim 7 wherein the hot gas by-pass is operably connected to the refrigerant system.

11. The apparatus of claim 10 wherein the hot gas by-pass is operably connected to the refrigerant system to provide a by-pass from an outlet side of the at least one variable speed compressor and an inlet side of an evaporator.

12. The apparatus of claim 10 wherein the hot gas by-pass is operably connected to the refrigerant system to provide a by-pass from an outlet side of the at least one variable speed compressor and an outlet side of an evaporator.

13. The apparatus of claim 1 further comprising:

a second motor speed controller that receives the change in demand signal to generate a condenser fan motor speed signal, wherein the second motor speed controller being adapted to send the condenser fan motor speed signal to at least one condenser fan motor to change the speed of the at least one condenser fan motor such that the speed of the at least one condenser fan is based on the sensed demand.

14. An apparatus for controlling the operating speed of at least one variable speed compressor in a refrigerated air drying system having changing demand on an air supply, the apparatus comprising:

a first heat exchanger circuit for drying an air supply;

at least one pressure sensor for monitoring a pressure of a refrigerant system and generating at least one pressure signal;

a motor speed controller that receives the at least one pressure signal to generate a motor speed signal, the motor speed controller is adapted to send the motor speed signal to the at least one variable speed compressor to change the speed of the at least one variable speed compressor such that the speed of the at least one variable speed compressor is based on the sensed demand; and a hot gas by-pass controller that receives at least one temperature signal and generates a hot gas by-pass signal when the temperature signal falls below a hot gas by-pass threshold that causes a hot gas by-pass to increase the temperature of the refrigerant.

15. The apparatus of claim 14 wherein the motor speed controller is further adapted to send a motor speed signal to at least one condenser fan motor to change the speed of the at least one condenser fan motor such that the speed of the at least one condenser fan motor is based on the sensed demand.

16. An apparatus for controlling the operating speed of at least one variable speed compressor in a refrigerated air drying system having changing demand on an air supply, the apparatus comprising:

a first heat exchanging means for drying an air supply;

means for sensing the demand on the air supply;

means for generating a change in demand signal based on the sensed demand change;

means for generating at least one motor speed control signal based on at least the generated change in demand signal, wherein the means for generating the at least one motor speed control signal is adapted to send the generated at least one motor speed control signal to the at least one variable speed compressor to change the speed of the at least one variable speed compressor such that the speed is based on the sensed demand.

17. The apparatus of claim 16 wherein means for generating at least one motor speed control signal is further adapted to send the generated at least one motor speed control signal to a condenser fan to change the speed of the condenser fan such that the speed of the condenser fan is based on the sensed demand.

18. The apparatus of claim 16 further including:

means for determining an operating speed of the at least one variable speed compressor.

19. The apparatus of claim 18 further including:

means for determining an operating speed of the condenser fan.

20. The apparatus of claim 18 further including:

means for monitoring a pressure of the refrigerant system; and means for performing a hot gas by-pass when the determining means determines that the at least one variable speed compressor is operating at a minimum speed and the monitoring means indicates the pressure of the refrigerant system is less than a hot gas by-pass pressure threshold.

21. The apparatus of claim 18 wherein the means for generating at least one motor speed control signal is adapted to generate a second motor speed control signal when the means for determining determines the at least one variable speed compressor is operating at a maximum speed and the means for sensing demand senses an increase in demand on the air supply.

* * * * *